(12) United States Patent
Sengoku et al.

(10) Patent No.: US 7,214,931 B2
(45) Date of Patent: May 8, 2007

(54) ENCODER FOR DETECTING MOVEMENT OF AN OBJECT

(75) Inventors: Norimasa Sengoku, Niwa-gun (JP); Yasuhiko Futamura, Niwa-gun (JP); Shigeji Ito, Niwa-gun (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 11/076,083

(22) Filed: Mar. 9, 2005

(65) Prior Publication Data

US 2005/0199791 A1 Sep. 15, 2005

(30) Foreign Application Priority Data

Mar. 12, 2004 (JP) .............................. 2004-071367

(51) Int. Cl.
*G01D 5/34* (2006.01)
*G01J 1/32* (2006.01)

(52) U.S. Cl. .................. 250/231.13; 250/205

(58) Field of Classification Search ..............................
250/231.13–231.18, 205, 214 R; 341/1, 341/2, 6, 9–11, 13, 14
See application file for complete search history.

(56) References Cited

U.S. PATENT DOCUMENTS

| 3,808,431 | A | * | 4/1974 | Hedrick | 250/231.18 |
| 4,593,194 | A | * | 6/1986 | Graham et al. | 250/231.16 |
| 4,649,267 | A | * | 3/1987 | Ray | 250/231.14 |
| 5,015,836 | A | * | 5/1991 | Van Antwerp | 250/231.13 |

FOREIGN PATENT DOCUMENTS

JP          2002-98522          4/2002

* cited by examiner

*Primary Examiner*—Que Tan Le
*Assistant Examiner*—Pascal M. Bui-Pho
(74) *Attorney, Agent, or Firm*—Synnestvedt & Lechner LLP

(57) ABSTRACT

An encoder for stably detecting the amount of movement of an object. The encoder includes an LED for emitting light toward a rotor plate including slits. An optical sensor generates an ON signal when the amount of emitted light passing through the slits exceeds a threshold value. A current increasing circuit increases the amount of current flowing through the LED when the optical sensor generates an ON signal.

3 Claims, 2 Drawing Sheets

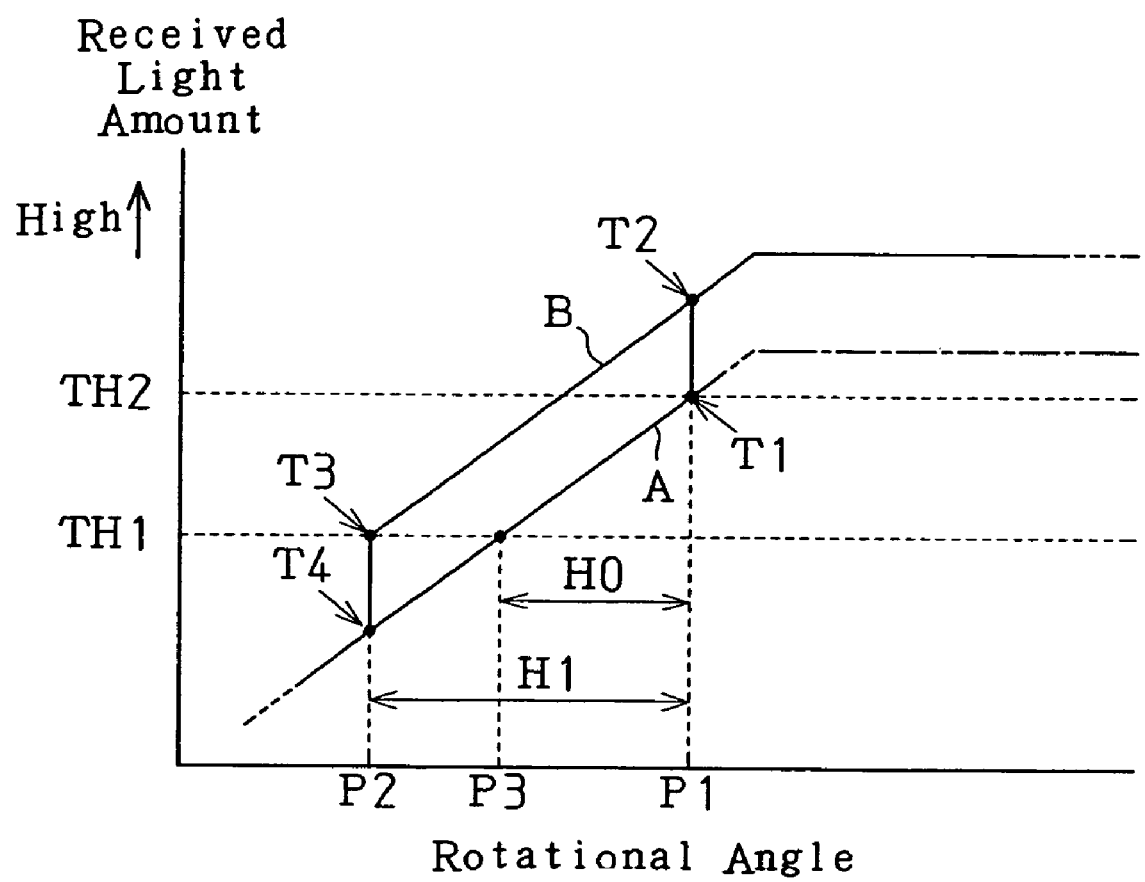

ENCODER FOR DETECTING MOVEMENT OF AN OBJECT

BACKGROUND OF THE INVENTION

The present invention relates to an encoder for detecting the amount of movement of an object, and more particularly, to an encoder for detecting the steering angle of a vehicle steering wheel.

An encoder that detects the rotational angle of a rotation body is known in the prior art. For example, Japanese Laid-Open Patent Publication No. 2002-98522 describes an encoder that detects the rotational angle of a rotor plate with a plurality of optical sensors. The encoder includes a light-emitting diode (LED), a rotor plate including a plurality of slits formed in the circumferential direction of the rotor plate, and an optical sensor arranged to sandwich the rotor plate with the LED. The optical sensor generates a signal corresponding to the amount of light that passes through the slits. More particularly, the optical sensor generates an ON signal when the amount of light is greater than a predetermined value and an OFF signal when the amount of light is less than the predetermined value. When the rotor plate rotates, the amount of light received by the optical sensor changes synchronously with the rotation of the rotor plate.

However, in the prior art encoder, when the rotor plate stops rotating at a position in which the LED faces toward an edge of a slit (i.e., position in which the amount of light that passes through the slit is in the vicinity of the threshold value of the optical sensor), slight rotation of the rotor plate (unexpected rotation caused by external disturbances) may repetitively generate the ON and OFF signals. Accordingly, the prior art rotor cannot stably detect the rotational angle (movement amount) of the rotor plate (object).

SUMMARY OF THE INVENTION

It is an object of the present invention to provide an encoder that stably detects the movement amount of an object.

One aspect of the present invention is an encoder for detecting the amount of movement of a movable object having a plurality of slits. The encoder includes a light emitting device for emitting light toward the object so that the emitted light is passable through the slits of the object. A detector receives the emitted light of the light emitting device that passes through the slits and generates an ON signal when the amount of emitted light exceeds a threshold value. A current increasing circuit increases the amount of current flowing through the light emitting device when the detector generates the ON signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a graph showing the relationship between the received light amount and the rotational angle of the steering wheel in the encoder of FIG. 1.

DETAILED DESCRIPTION OF THE PREFERRED EMBODIMENTS

Figure 1:
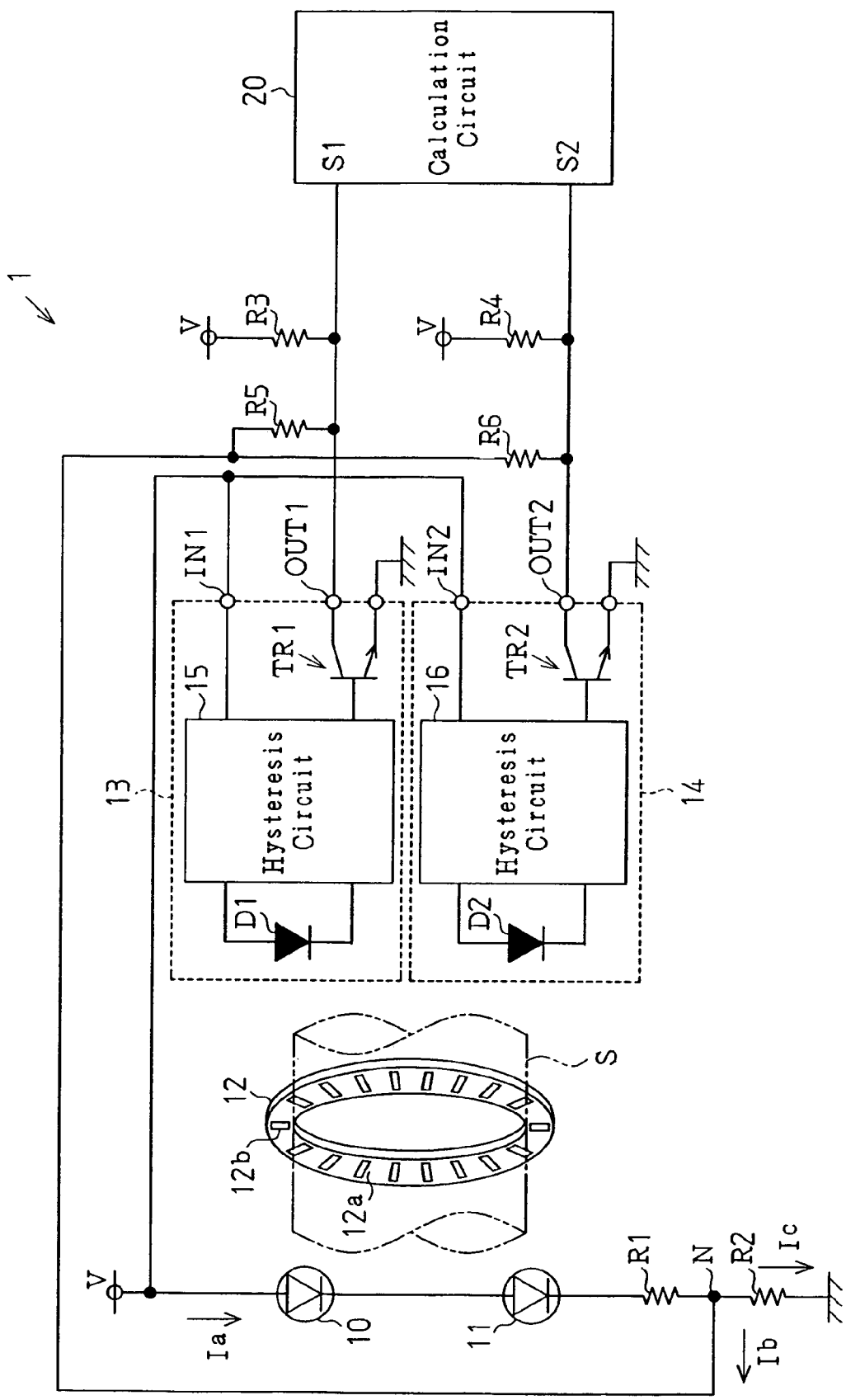
FIG. 1 is a schematic circuit diagram of an encoder according to a preferred embodiment of the present invention.

An encoder 1 (rotational angle detector) according to a preferred embodiment of the present invention will now be described with reference to FIGS. 1 and 2. The encoder 1 detects the steering angle of a vehicle steering wheel.

Referring to FIG. 1, the encoder 1 includes light emitting diodes (LEDs) 10 and 11 functioning as light emitting devices, a rotor plate 12, and optical sensors 13 and 14 arranged to sandwich the rotor plate 12 with the LEDs 10 and 11. The encoder 1 further includes a calculation circuit 20 for calculating the rotational angle of the rotor plate 12 using signals provided from the optical sensors 13 and 14. The encoder 1 may include three or more LEDs to form a failsafe configuration.

The rotor plate 12, which is annular and has a hole, includes a detection surface 12a. A steering shaft S is fitted in the hole of the rotor plate 12. A plurality of slits 12b are formed in the detection surface 12a of the rotor plate 12 at predetermined intervals in the circumferential direction. The LEDs 10 and 11 are arranged above the detection surface 12a so as to face towards the slits 12b during rotation of the rotor plate 12. Further, the LEDs 10 and 11 are separated from the detection surface by a predetermined distance.

The LEDs 10 and 11 are connected in series between a power supply V and the ground. More specifically, the LED 10 includes an anode terminal connected to the power supply V and a cathode terminal connected to the anode terminal of the LED 11. The LED 11 includes a cathode terminal connected to the ground via series-connected resistors R1 and R2.

The optical sensor 13 includes a photodiode D1 (light receiving device), a hysteresis circuit 15, and a transistor TR1 (switching device). The optical sensor 14 includes a photodiode D2 (light receiving device), a hysteresis circuit 16, and a transistor TR2 (switching device). The optical sensors 13 and 14 are sensors that are known in the art and will thus not be described in detail.

Based on the amount of the light received by the photodiode D1, the hysteresis circuit 15 controls the activation and inactivation of the transistor TR1. More specifically, as shown in FIG. 2, the hysteresis circuit 15 activates the transistor TR1 when the received light amount of the photodiode D1 exceeds a predetermined ON threshold value TH2 and inactivates the transistor TR1 when the received light amount is less than or equal to a predetermined OFF threshold value TH1. The OFF threshold value TH1 is set at a value that is lower than the ON threshold value TH2. The hysteresis circuit 15 does not inactivate the transistor TR1 even if the received light amount decreases and becomes less than or equal to the ON threshold value TH2 as long as the received light amount is greater than the OFF threshold value TH1. The hysteresis circuit 16 controls the activation and inactivation of the transistor TR2 in the same manner as the hysteresis circuit 15.

In the preferred embodiment, the transistor TR1 is preferably an NPN transistor. Referring to FIG. 1, the transistor TR1 includes a collector terminal connected to an output terminal OUT1, an emitter terminal connected to the ground, and a base connected to the hysteresis circuit 15. When the transistor TR1 is activated, the output terminal OUT1 is grounded. This generates an ON signal. When the transistor TR1 is inactivated, an OFF signal is generated. The transistor TR2 has the same configuration and connection relationship as the transistor TR1. When the transistor TR2 is activated, the output terminal OUT2 is grounded. This generates an ON signal. When the transistor TR2 is inactivated, an OFF signal is generated.

The hysteresis circuit 15 of the optical sensor 13 is connected to the power supply V via an input terminal IN1. The output terminal OUT1 of the optical sensor 13 is connected to the power supply V, via a pull-up resistor R3, and to a signal terminal S1 of the calculation circuit 20. When the transistor TR1 of the optical sensor 13 is activated, an ON signal having ground level is applied to the signal terminal S1. When the transistor TR1 is inactivated, an OFF signal having a power supply voltage level is applied to the signal terminal S1.

The hysteresis circuit 16 of the optical sensor 14 is connected to the power supply V via the input terminal IN1. The output terminal OUT2 of the optical sensor 14 is connected to the power supply V, via a pull-up resistor R4, and to a signal terminal S2 of the calculation circuit 20. When the transistor TR2 of the optical sensor 14 is activated, an ON signal having ground level is applied to the signal terminal S2. When the transistor TR2 is inactivated, an OFF signal having a power supply voltage level is applied to the signal terminal S2. The calculation circuit 20 calculates the rotational angle of the rotor plate 12 based on the ON signal and OFF signal provided to each of the signal terminals S1 and S2.

The output terminal OUT1 is connected to a node N between the resistors R1 and R2 via a resistor R5, which functions as a current increasing circuit. When the transistor TR1 of the optical sensor 13 is activated, the node N is grounded via the resistor R5 and the transistor TR1. The output terminal OUT2 is connected to the node N via a resistor R6, which functions as a current increasing circuit. When the transistor TR2 of the optical sensor 14 is activated, the node N is grounded via the resistor R6 and the transistor TR2. Accordingly, when the transistor TR1 is activated, the resistors R2 and R5 are connected in parallel to the ground path of the LEDs 10 and 11. Further, when the transistor TR2 is activated, the resistors R2 and R6 are connected in parallel to the ground path of the LEDs 10 and 11.

The operation of the encoder 1 will now be described. The operations of the optical sensor 13 and the optical sensor 14 are the same. Thus, the operation of the optical sensor 13 will mainly be described.

Referring to FIG. 2, as the rotor plate 12 rotates and a slit 12b approaches the light emitting region of the LED 10, the received light amount of the photodiode D1 in the optical sensor 13 increases. When the received light amount of the photodiode D1 exceeds the ON threshold value TH2, the transistor TR1 of the optical sensor 13 is activated, and the optical sensor 13 generates an ON signal (point P1).

When the optical sensor 13 of the transistor TR1 is activated, the node N is grounded via the resistor R5 and the transistor TR1. Specifically, node N is grounded via the resistors R1 and R5 and the transistor TR1. Thus, the current Ia flowing through the LED 10 is the sum of the current Ic flowing through the resistor R2 and the current Ib flowing through the resistor R5. Accordingly, current that is greater than the current before activation of the transistor TR1 by an amount corresponding to Ib flows through the LED 10. This increases the emitted light amount of the LED 10, and the received light amount of the optical sensor 13 increases from the light amount indicated at point T1 to the light amount indicated at point T2. Point T2 is a point on line B, which indicates the relationship between the rotational angle of the rotor plate 12 and the received light amount of the photodiode D1. In other words, the increase in the emitted light amount of the LED 10 is translated in parallel from line A extending through point T1 to line B extending through point T2. In the preferred embodiment, to facilitate description, it is presumed that the rotational angle and the received light amount are in proportional relationship. However, the relationship between the rotational angle and the received light amount differs in accordance with the characteristics of the optical sensor 13, and the relationship does not have to be a proportional one.

Subsequently, when the rotor plate 12 further rotates or rotates in the reverse direction, the light emitted by the LED 10 is blocked by the portion between adjacent slits 12b of the rotor plate 12. This decreases the received light amount of the optical sensor 13 in accordance with the inclination of the line B. When the received light amount becomes less than or equal to the OFF threshold value TH1, the transistor TR1 of the optical sensor 13 is inactivated, and the optical sensor 13 provides the OFF signal to the output terminal OUT1 (point P2). The inactivation of the transistor TR1 of the optical sensor 13 grounds the node N via only the resistor R2. Thus, the current Ia flowing through the LED 10 becomes equal to the current Ic flowing through the resistors R1 and R2. This decreases the emitted light amount of the LED 10, and the received light amount of the optical sensor 13 decreases from the light amount indicated by point T3 to the light amount indicated by point T4. Point T4 lies along line A. In other words, the decrease in the emitted light amount of the LED 10 translates the line indicating the relationship between the rotational angle and the received light amount in parallel from line B, which extends through point T3, to line A, which extends through point T4. Thus, the difference between the rotational angle at which the transistor TR1 is activated (rotational angle at point P1) and the rotational angle at which the transistor TR1 is inactivated (rotational angle at point P2) is shown as hysteresis H1. That is, the optical sensor 13 has a hysteresis characteristic between the rotational angle at which the transistor TR1 is activated and the rotational angle at which the transistor TR1 is inactivated.

With the prior art encoder, the amount of current flowing through the LED 10 does not increase even if the transistor TR1 is activated at point P1. Thus, the transistor TR1 is inactivated at point P3 in accordance with line A. In this state hysteresis H0 is smaller than hysteresis H1. In comparison, in the preferred embodiment, the amount of current flowing through the LED 10 when the transistor TR1 is activated increases the hysteresis from hysteresis H0 to hysteresis H1. This widens the tolerable range of slight movements of the rotor plate 12 (unexpected rotation caused by external disturbance) by an amount corresponding to the hysteresis increase (H1-H0) and lengthens the period during which the ON signal is stably maintained.

The encoder 1 of the preferred embodiment has the advantages described below.

(1) The transistors TR1 and TR2 of the optical sensors 13 and 14 are activated when the amount of light passing through the slits 12b of the rotor plate 12 exceeds the ON threshold value TH2. Activation of the transistors TR1 and TR2 increases the amount of current flowing through the LEDs 10 and 11. This increases the emitted light amount of the LEDs 10 and 11. Thus, the hysteresis increases from hysteresis H0 of the prior art to hysteresis H1. After outputting ON signals, the optical sensors 13 and 14 maintain the ON signals and does not generate OFF signals even if the rotor plate 12 is rotated in the rotational angle range represented by hysteresis H1. Thus, for example, even if the steering wheel is rotated in an unexpected manner due to vibrations produced by the road surface or vibrations produced when driving along a bumpy road, the encoder 1 detects the steering angle of the steering wheel without being affected by such external disturbance. Accordingly, the rotation angle of the rotor plate 12 is stably detected.

(2) An increase in the received light amount of the optical sensors 13 and 14 increases the hysteresis of the optical sensors 13 and 14. Accordingly, even when using a general-purpose optical sensor having a relatively small hysteresis, the hysteresis of the optical sensors 13 and 14 is increased and the steering angle of the steering wheel may stably be detected without being affected by external disturbances. This prevents the cost of the encoder from being increased.

(3) When the amount of light passing through the slits 12b exceeds the ON threshold value TH2, the transistors TR1 and TR2 are activated. This connects the resistor R2 and the resistors R5 and R6 parallel to the ground path. In this manner, a simple circuit configuration that includes the resistors R5 and R6 increases the amount of current flowing through the LEDs 10 and 11, and the rotational angle of the rotor plate 12 is stably detected.

(4) After the transistors TR1 and TR2 are activated, the optical sensors 13 and 14 do not generate an OFF signal as long as the rotor plate 12 rotates within the rotational angle range represented by hysteresis H1. In other words, as long as the rotor plate 12 rotates within the rotational angle range represented by hysteresis H1, the optical sensors 13 and 14 do not repetitively generate ON and OFF signals. Thus, the calculation circuit 20 does not have to incorporate a special circuit for eliminating rotational angle fluctuations caused by frequent repetition of the ON and OFF signals. Accordingly, the calculation circuit 20 has a relatively simple configuration. Further, even if the calculation circuit 20 were to be provided with a CPU having software for eliminating rotational angle fluctuations caused by frequent repetition of the ON and OFF signals, there would be no need to perform the elimination. This would decrease the load on the CPU.

(5) The amount of current flowing through the LEDs 10 and 11 when the transistors TR1 and TR2 of the optical sensors 13 and 14 are activated changes depending on the resistance of the resistors R5 and R6. More specifically, the amount of current flowing through the LEDs 10 and 11 is increased when the resistance of the resistors R5 and R6 is increased. Conversely, the amount of current flowing through the LEDs 10 and 11 is decreased when the resistance of the resistors R5 and R6 is decreased. Thus, hysteresis may be adjusted by changing the resistance of the resistors R5 and R6. Accordingly, the hysteresis of the encoder 1 may be adjusted to an optimal level in accordance with external disturbances of the vehicle. The hysteresis may also be optimized in accordance with, for example, the vehicle type so that the hysteresis corresponds to the behavior of the steering wheel resulting from vibrations unique to the vehicle.

(6) The current flowing through the LEDs 10 and 11 increases only when the transistors TR1 and TR2 of the optical sensors 13 and 14 are activated. This decreases the power consumption of the encoder 1 in comparison to when current constantly flows through the LEDs 10 and 11.

It should be apparent to those skilled in the art that the present invention may be embodied in many other specific forms without departing from the spirit or scope of the invention. Particularly, it should be understood that the present invention may be embodied in the following forms.

The OFF threshold value TH1 may be equal to the ON threshold value TH2. In this case, the activation of the transistors TR1 and TR2 also increases the amount of light emitted by the LEDs 10 and 11. Thus, the encoder 1 stably detects the rotational angle without being affected by rotation of the steering wheel resulting from external disturbances. Especially, when using an optical sensor that does not have hysteresis, there is a high possibility that outputs of the ON and OFF signals would be frequently repeated due to external disturbances. Accordingly, in such optical sensor, an increase in the current of the LEDs 10 and 11 is especially effective for stably detecting the rotational angle of the rotor plate 12.

Activation of the transistors TR1 and TR2 grounds the node N via the resistors R5 and R6. Instead of such a configuration, a current increasing circuit for grounding the node N via the resistors R5 and R6 in response to an ON signal from the transistors TR1 and TR2 may be provided. For example, the current increasing circuit may include a CPU for monitoring whether or not the transistors TR1 and TR2 have been activated and whether or not an ON signal has been generated. For example, the current increasing circuit is configured to drive a relay in response to an ON signal to ground the node N via the resistor R5 and R6. The current increasing circuit may include a current source for supplying current to a current supply path of the LEDs 10 and 11 in response to an ON signal from the transistors TR1 and TR2. Further, the timing for increasing the amount of current flowing through the LEDs 10 and 11 is not limited to the point of time when the transistors TR1 and TR2 are activated.

The resistors R5 and R6 may be arranged in the ground path of the transistors TR1 and TR2.

The load connected to node N is not limited to resistance loads, such as the resistors R5 and R6. For example, a coil or a capacitor having a resistance component may be used as the load.

The resistors R5 and R6 do not have to be connected to the transistors TR1 and TR2. In this case, instead of the resistors R5 and R6, the ON resistance of the transistors TR1 and TR2 contribute to increasing the current flowing through the LEDs 10 and 11.

The encoder of the preferred embodiment is applied to detect the rotation of the rotor plate 12. However, the encoder of the present invention may also be applied to a linear scale for detecting the movement amount of an object that moves linearly.

The present examples and embodiments are to be considered as illustrative and not restrictive, and the invention is not to be limited to the details given herein, but may be modified within the scope and equivalence of the appended claims.

What is claimed is:

1. An encoder for detecting the amount of movement of a movable object having a plurality of slits, the encoder comprising:

a light emitting device for emitting light toward the object so that the emitted light is passable through the slits of the object, wherein the light emitting device is connected to ground;

a detector for receiving the emitted light of the light emitting device that passes through the slits and for generating an ON signal when the amount of emitted light exceeds a threshold value;

a current increasing circuit for increasing the amount of current flowing through the light emitting device when the detector generates the ON signal, wherein the detector includes a switching device, having a power supply terminal connected to a power supply and a ground terminal connected to ground, for connecting the power supply to ground when the amount of emitted light exceeds a threshold value; and the current increasing circuit includes a load connected between the power supply terminal of the switching device and a node between the light emitting device and ground, and a resistor connected between the node and ground, wherein the switching device connects the power supply to ground such that the current flowing through the light emitting device is the sum of the current flowing through the load and the current flowing through the resistor to increase the amount of current flowing through the light emitting device.

2. The encoder according to claim 1, wherein the detector generates the ON signal when the amount of emitted light exceeds an ON threshold value and generates an OFF signal when the amount of emitted light decreases to an OFF threshold value that is lower than the ON threshold value.

3. The encoder according to claim 1, wherein the load is a resistor.

* * * * *